United States Patent Office

3,707,524
Patented Dec. 26, 1972

3,707,524
SINGLE-PHASE COMPOSITES OF CHLORAL POLYMERS AND COPOLYMERS WITH ADDITION POLYMERS
Otto F. Vogl, Wilmington, Del., assignor to E. I. du Pont de Nemours and Company, Wilmington, Del.
No Drawing. Continuation-in-part of applications Ser. No. 558,631, June 20, 1966, Ser. No. 580,217, Sept. 19, 1966, Ser. No. 731,622, May 23, 1968, and Ser. No. 886,739, Dec. 19, 1969. This application June 2, 1970, Ser. No. 42,877
Int. Cl. C08f 15/12, 29/26, 45/02
U.S. Cl. 260—41 B          20 Claims

ABSTRACT OF THE DISCLOSURE

Described are fire resistant single-phase composites of chloral homopolymers, chloral/isocyanate copolymers, and chloral/ketene copolymers with addition polymers. The products are useful as architectural panels.

RELATED APPLICATIONS

This application is a continuation-in-part of my prior patent applications S.N. 886,739 filed Dec. 19, 1969, now U.S. 3,668,184; S.N. 731,622 filed May 23, 1968; S.N. 580,217 filed Sept. 19, 1966; and S.N. 558,631 filed June 20, 1966; the last three of which are now abandoned.

BACKGROUND OF THE INVENTION

Field of the invention

This invention is concerned with composites of chloral homopolymers, chloral/isocyanate copolymers, and chloral/ketene copolymers with addition polymers and methods for their preparation.

Description of prior art

Chloral homopolymers, chloral/isocyanate copolymers, and chloral/ketene copolymers have fire-resistant properties. Many of them are not suitable for being blended uniformly with other polymeric materials by the known procedures of melt blending and hot roll mixing because of their infusibility. Yet it is highly desirable to intimately incorporate such chloral polymers with other polymeric materials because of the fire-resistance properties that are imparted thereby.

One approach to this problem is to grind or otherwise convert chloral homopolymers or copolymers to very finely divided particles and incorporate these fine particles in other polymers by the known methods for incorporating finely divided pigments or fillers into polymers. However, such pigmented or filled polymers are not uniform, continuous, single-phase polymers and are weaker than the basic polymer being modified. Further, only part of the fire resisting potential of the added chloral homopolymer or copolymer is realized.

DESCRIPTION OF THE INVENTION

There have now been discovered uniform, continuous single-phase, solid composites of chloral homopolymers and chloral/isocyanate copolymers and chloral/ketene copolymers with addition polymers.

The processes useful for their preparation consist of:

(A) Dissolving a preformed addition polymer in a chloral component comprising a mixture of chloral monomer (with or without added isocyanate comonomer or ketene comonomer), an anionic initiator for the polymerization of the chloral component, and an inert solvent (if one is needed to solubilize the initiator), at a temperature above the threshold polymerization temperature of the chloral component. The uniform solution is then cooled below the threshold polymerization temperature of the chloral component to polymerize it under quiescent conditions. This process of adding a polymerization initiator to the chloral component at a temperature above the point where the chloral component polymerizes and then cooling below such temperature to produce polymerization under quiescent conditions is known as cryotachensic polymerization. By "quiescent conditions" is meant that the components undergoing polymerization are relatively motionless in that no stirring or agitation occurs.

(B) Imbibing or soaking an addition-polymerizable monomer and an initiator for its polymerization uniformly into preformed chloral homopolymer or chloral/isocyanate copolymer or chloral/ketone copolymer and allowing the monomer to polymerize either by contact with the initiator at ambient temperature or by activation of the initiator, if needed, e.g., by heating, photolysis or irradiation with X-rays.

(C) Preparing a chloral component comprising a uniform solution of monomeric chloral (with or without added isocyanate or ketene comonomer), an anionic initiator for the chloral component (plus an inert solvent if needed for the initiator), adding thereto an addition-polymerizable monomer and an initiator for polymerization of the addition-polymerizable monomer, all at a temperature above the threshold polymerization temperature of the chloral component. The following two steps are then carried out in any order:

(1) Cooling the entire mixture below the threshold polymerization temperature to polymerize the chloral component under quiescent conditions.

(2) Allowing the addition-polymerizable monomer to polymerize by contact with the initiator or by activating the initiator, if necessary, by heating, photolysis or irradiation with X-rays.

The composites prepared as shown above have both the chloral homopolymer or copolymer molecules and the addition polymer molecules in the form of a single, uniform, continuous, intimate network and the polymers cannot be separated from each other. The composites are substantially single-phase compositions which display the maximum fire-resistant properties obtainable from the chloral component and have greatly enhanced strength and toughness over multi-phase mixtures involving discrete particles of either of the same components in a matrix of the other. The single-phase composites of this invention are not simple mixtures of different polymers nor do the different polymers appear to be chemically linked to each other to any substantial extent. Because the composites cannot be separated into their polymeric components it is possible the molecules of the components may be molecularly dispersed in each other, that is, one polymer may be formed in and occupies the interstices of the other so the polymers are in effect mechanically locked together. This would account for the development of maximum flammability resistance associated with the chloral component as well as the unusual spread of other physical properties possible within the range of the compositions of this invention. Applicant wishes to make it clear however that he does not intend to be bound by this or any other theory of how the single-phase composites are constituted.

The composites of this invention may contain from about 16 to 99.9 mole percent of the chloral or chloral/isocyanate, chloral/isothiocyanate or chloral/ketene component and from 0.1 to about 84 mole percent of the addition polymer component. These molar relationships are determined on a monomer basis, the total molar percentage of chloral and isocyanate or isothiocyanate or ketene monomer units being compared with the total molar percentage of addition monomer units.

Regardless of which of the three processes above is used, crosslinking or block copolymerization between segments of the two components is minimal and involves less than 10 percent of the total weight of the composite.

The physical form of the composites of this invention containing 80 mole percent or more of the chloral component is largely determined by the mold in which they are formed at the time the cryotachensic polymerization of the chloral component takes place. Composites containing 80 mole percent or more of the chloral component are presently preferred and because they are not fusible they cannot be reshaped by thermoplastic molding operations such as compression molding, injection molding or melt extrusion. Composites of the invention which contain lesser amounts of the chloral component may be further shaped to some extent by cold or hot rolling or drawing, including drawing of fibers and deep drawing of films and sheeting.

All of the composites of this invention are solids which are useful in the form of fire-resistant rods, tubes, pipes, panels, boxes, buckets, cups and containers of all sorts. The composites may be colored or rendered opaque by the addition of known pigments and fillers such as calcium carbonate and aluminum oxide trihydrate or reinforced by incorporating fibers of glass, silica, carbon, rutile, and the like. Such incorporations are carried out prior to the polymerization of the chloral component. The composites are also useful in the form of transparent and translucent sheeting for architectural panels and for glazing of buildings, ships and aircraft. For glazing uses the composites are tougher than glass and more fire-resistant than polymethyl methacrylate. The products are all particularly useful in the form of sheeting for architectural panels and for roofing shingles and tiles.

The composite polymers of this invention comprise a single-phase composite polymer comprising at least two separately formed but inseparable polymers, at least one being a chloral polymer and at least one being an addition polymer other than a chloral polymer. More specifically, the composite polymers comprise at least one addition polymer component and at least one chloral polymer component, the chloral polymer component being chloral homopolymer or a copolymer of chloral and at least one comonomer selected from the group consisting of

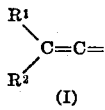 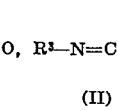 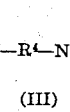

(I)  (II)  (III)

wherein

X is selected from the group consisting of oxygen and sulphur;

$R^1$ and $R^2$, alike or different and separately or jointly, are (1) monovalent groups selected from the group consisting of hydrogen, cyano, lower alkoxycarbonyl, and unsubstituted and substituted hydrocarbyl and hydrocarbyloxy in which any hydrocarbyl moiety is of 1–18 carbon atoms selected from the group consisting of alkyl, cycloalkyl, alkenyl, aryl, aralkyl and alkaryl, and any substituent is selected from the group consisting of lower alkoxy, fluorine, chlorine, bromine, and iodine; and (2) divalent groups selected from alkylene of 2 to 7 carbons;

$R^3$ is selected from the group consisting of nonsubstituted and substituted alkyl, cycloalkyl, and alkenyl of up to 18 carbons, aryl of 6–18 carbons and alkaryl and aralkyl of 7–24 carbons, any substitution being selected from the group consisting of fluorine, chlorine, bromine, iodine, nitro, cyano, phenylazo, —$NY_2$, —OY, —SY,

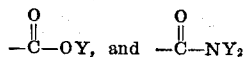

in which Y is lower alkyl or phenyl; and $R^4$ is selected from the group consisting of nonsubstituted and substituted alkylene, alkenylene, alkadienylene, alkarylene, aralkylene, cycloalkylene, alkylenebis(cycloalkylene), alkylenebis(arylene), arylene, arylenebis(alkylene) of up to 18 carbons and anthraquinonylene, any substitution being selected from the group consisting of fluorine, chlorine, bromine, iodine, nitro, cyano, phenylazo, —$NY_2$, —OY, —SY,

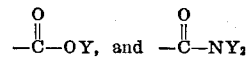

in which Y is lower alkyl or phenyl; and wherein the addition polymer is a polymer of a monomer selected from the group consisting of (A) At least one monomer having the formula

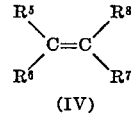

(IV)

wherein $R^5$ is hydrogen, halogen, lower alkyl, lower alkenyl, phenyl, lower alkoxy, lower alkylcarbonyl, carboxy, lower alkoxycarbonyl, lower alkylcarbonyloxy, cyano, carbamoyl, carbazolyl, or N,N-di(lower alkyl)carbamoyl;

$R^6$ is hydrogen, halogen, lower alkyl, vinyl, halovinyl, lower alkyl vinyl, cyano, methylpyridinyl, or phenylene sodium sulfonate;

$R^7$ is hydrogen, halogen, carboxy or lower alkoxycarbonyl, with the proviso that $R^6$ and $R^7$ taken together may be an alkylene group of 1 to 6 carbon atoms; and $R^8$ is hydrogen or halogen;

(B) A monomer having the formula

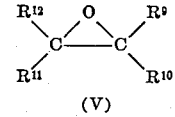

(V)

wherein $R^9$ is hydrogen, methyl, chloromethyl, phenyl, lower alkoxycarbonyl, lower alkoxymethyl or phenoxymethyl;

$R^{10}$, $R^{11}$ and $R^{12}$ alike or different are hydrogen or methyl with the proviso that $R^9$ and $R^{12}$ taken together may be tetramethylene;

(C) A monomer having the formula

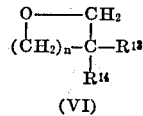

(VI)

wherein $n$ is 1 or 2; $R^{13}$ and $R^{14}$ are hydrogen or chloromethyl when $n$ is 1 and hydrogen when $n$ is 2; and (D) A monomer having the formula

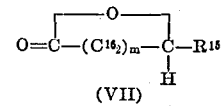

(VII)

wherein $m$ is 1 or 4; $R^{15}$ and $R^{16}$ are hydrogen or methyl when $m$ is 1 and hydrogen when $m$ is 4.

It is to be further understood that the addition polymer components may comprise copolymers as well as homopolymers.

In the above definitions, "halogen" includes fluorine, chlorine, bromine and iodine, and "lower" means 1 to 6 carbons in the hydrocarbon part of the radical, e.g., "lower alkyl" or "lower alkenyl" indicates alkyl or alkenyl of 1 to 6 carbon atoms. It is preferred that when more than two of the groups $R^5$ to $R^8$, inclusive, are halogen, no more than two of them should have an atomic number greater than 9. It is to be also understood that when $R^6$ is vinyl or substituted vinyl, the resulting diene may be copolymerized in 1,2- or 1,4-configurations or in a combination of these.

The chloral and chloral/isocyanate polymers used in this invention may be represented by the formulas:

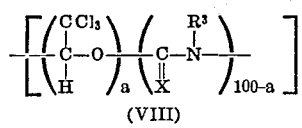

(VIII)

or

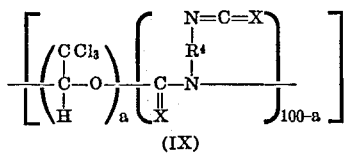

(IX)

in which $a$ is the mole percent of chloral and is any number from 1 to 100, inclusive, preferably from 80 to 100 inclusive.

The chloral/ketene components of this invention may be represented by the formula

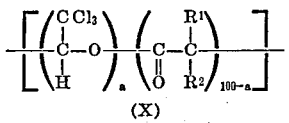

(X)

in which $a$ is the mole percent of chloral and is any number from 1 to 100 inclusive, preferably from 1 to 99.

It will be understood that more than one compound of Formula I, II, or II can be polymerized simultaneously with chloral in preparing the composites of this invention.

The chloral, chloral/isocyanate, chloral/diisocyanate and chloral/ketene polymer components of this invention may be represented generically by the formula:

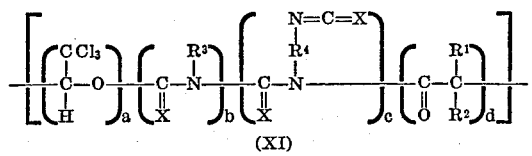

(XI)

in which $a$ is the mole percent of chloral and represents any number from 1 to 100 inclusive; and $b$, $c$ and $d$ are the respective mole percentages of isocyanate, diisocyanate and ketene, and are numbers from 0 up to $100-a$, with the proviso that $b+c+d=100-a$.

Chloral, chloral/isocyanate and chloral/ketene polymer components in the compositions of this invention are prepared by cryotachensic polymerization. This is a process for polymerizing homogeneous mixtures containing monomer and polymerization initiator which are stable against polymerization at temperatures above a threshold polymerization temperature characteristic of the particular mixture employed. In this process there is rendered homogeneous at a temperature above its threshold polymerization temperature chloral or a mixture of chloral and an isocyanate or ketene comonomer or comonomers, an anionic (Lewis base) initiator (i.e., one that causes anionic polymerization) in an amount corresponding to 0.001 to 10% of the combined weight of chloral and comonomer(s), and 0 to 99% by weight of the total composition of an aprotic solvent. The order of addition is usually not critical but the initiator is preferably added after the addition of any solvent. The mixture is allowed to become quiescent and is then cooled to or preferably below its threshold polymerization temperature to enable polymerization to take place under quiescent conditions. Cooling may be accomplished by any suitable means known in the art.

The cryotachensic polymerization process can be carried out in the presence of air. However, it is preferred to use an atmosphere to which the monomers and the initiator are inert. Thus, it is desirable to exclude moisture, oxygen, carbon dioxide, acidic or basic vapors, and vapors of aprotic solvents. An inert atmosphere is preferred when the monomers per se are to be held for substantial lengths of time prior to polymerization and is particularly advantageous when it is desired to hold a mixture containing the monomers and a polymerization initiator above the threshold polymerization temperature for more than a few minutes. An inert atmosphere may be obtained by operating in nitrogen, helium, or the like; by operating at reduced pressures; or by other means known in the art.

It is preferable to bring about polymerization by cooling the polymerization mixture below its threshold temperature within a short time after contact of the initiator with the monomers. For example, it is preferable to carry out polymerization within one hour after contact of monomers with the initiator and more preferably within 10 minutes or less.

Polymerization initiators which are suitable are all those known to initiate anionic polymerization and include those described in U.S. Pat. 3,454,527 and my copending, coassigned application Ser. No. 731,622. Effective initiating amounts of initiator are generally between 0.001 and 10% of the combined weight of the chloral and comonomer(s); preferred amounts are 0.005 to 5% by weight. Many of the initiators are Lewis bases. Examples of initiators include:

(a) Tertiary organic compounds of elements of Group V–A of the Periodic Table, i.e., compounds $QR_3$, where Q is N, P, As, Sb, or Bi, and R is a hydrocarbyl group containing 1–18 carbon atoms with the proviso that when Q is N, no more than one R can be aryl. The R groups may be alike or different and can be taken together to indicate the hydrocarbon part of a cyclic 5- to 7-membered ring system in which Q is a heteroatom; as in pyridine, substituted pyridines such as trimethylpyridine, quinoline, triethylenediamine, and alkyl, aryl and benzo derivatives of such compounds. Thus, the hydrocarbyl groups may be alkyl as in methyl, ethyl, dodecyl and octadecyl; alkenyl as in 9-octadecenyl; aryl as in phenyl, naphthyl, anthryl and benzanthryl; cycloalkyl as in cyclopropyl, cyclopentyl, cyclohexyl, and cycloheptyl; aralkyl as in benzyl and phenethyl; alkaryl as in tolyl and xylyl; and the like;

(b) Onium, particularly ammonium, phosphonium and sulfonium fluorides, chlorides, bromides, iodides, hydroxides, alkoxides, thioalkoxides, carboxylates, cyanamides, cyanates, thiocyanates, and azides. The onium cations may be hydrocarbyl substituted, the hydrocarbyl groups being as described for the first group of initiators (a) above;

(c) Group I–A, Group II–A, or Group III–A metal hydrides, hydroxides, halides, alkyls, alkoxides, carboxylates, cyanamides, cyanates, thiocyanates, and azides; particularly lithium chloride and similar halides; and (d) Phosphine and phosphonium compounds wherein the phosphorus atom carries one or more substituents such as hydrocarbyl groups as described for the first group of initiators (a) above; hydrocarbyl groups containing halogen; and hydrocarbyl groups and halogenated hydrocarbyl groups connected to P through oxygen or sulfur.

The Groups I–A, II–A, and III–A referred to herein are those set forth in the Periodic Table contained in Deming's "General Chemistry," John Wiley & Sons, Inc., New York, 5 ed., chap. 11.

The aprotic solvents, when used as reaction media, must be unreactive with the monomers and the initiator, and preferably be good solvents for each. The polymerization mixture must be liquid above its threshold polymerization temperature. Aromatic and aliphatic hydrocarbons, ethers, and ketones are preferred. Toluene is particularly preferred. Halocarbons such as carbon tetrachloride and esters and amides such as N,N-dimethylformamide and N,N-dimethylacetamide are operable if the polymerization is carried out within less than one hour, and particularly less than a few minutes after mixing of the monomers with the solvent and initiator. Additional suitable solvents which may be mentioned include benzene, n-hexane, cyclohexane, diethyl ether, anisole, acetone, methyl ethyl ketone, ethyl acetate, acetonitrile, nitrobenzene, methylene chloride, chloroform, tert-butyl chloride, dimethyl sulfoxide, tetramethylurea, hexamethylphosphoramide, and the like. The amount of aprotic solvent may be varied from 0–99% of the weight of the total composition being polymerized. Amounts up to 10% by weight aid in dispersing the initiator in the monomers. High concentrations of aprotic solvent can assist in the application of the unpolymerized mixture as a paint, or for dipping, impregnating and coating operations prior to or in conjunction with cooling to bring about polymerization.

With initiators which are readily soluble in the warm monomer mixture, no added liquid is required for dispersing purposes. A small amount of such liquid, however, may be desirable to permit shrinkage of the bulk copolymer by evaporation of the liquid after polymerization. This is sometimes useful in providing for removal of complicated solid shapes from the molds in which they are prepared.

The polymerization mixture can be prepared in the mold in which the polymer is to be formed or the mixture can be prepared in another container and then transferred to the mold which is at a temperature above the threshold polymerization temperature and which is then cooled therebelow to bring about polymerization.

The threshold polymerization temperature of a polymerization mixture containing monomeric chloral, one or more ketenes and/or one or more isocyanates, isothiocyanates, diisocyanates or diisothiocyanates and an initiator, and optionally a solvent is determined as follows: The mixture is prepared and thoroughly blended at an elevated temperature, e.g., at its reflux temperature or at 65° C., whichever is lower. The mixture is then stirred and cooled at a rate of 2° C./minute, the stirring being conducted to insure uniform cooling of the entire mass of liquid. The threshold polymerization temperature is that temperature at which there is noted the first haziness or opalescence due to solid copolymer separating in the mixture.

The monomer - initiator - solvent compositions have threshold polymerization temperatures in the range from 0–60° C. The threshold temperature is affected by both the nature and the amount of the ketene, isocyanate, isothiocyanate, diisocyanate or diisothiocyanate comonomers and any aprotic liquid present. The maximum temperature at which the polymerization mixture is prepared is not critical and generally falls between the threshold polymerization temperature of the particular mixture and the reflux temperature thereof.

Copolymerization of the monomers in the polymerization mixture can be conducted at the threshold polymerization temperature. However, the heat of polymerization is most readily dissipated and the toughness and molecular weight of the polymer are increased if a polymerization temperature of at least 5° C. below the threshold polymerization temperature is used, and preferably the temperature is at least 25° C. below the still more preferable, at least 50 to 135° C. below the threshold polymerization temperature.

In the process of cryotachensic polymerization, the polymerization initiator is always uniformly distributed in the monomer mixture before any polymerization occurs. Thus, when polymerization is brought about by cooling the mixture below the threshold polymerization temperature, the composition becomes uniformly gelled and unflowable within one minute or less. The degree of conversion of monomers to copolymer increases with time but generally is substantially complete within one hour.

The addition polymer components used in this invention contain at least one recurring unit of the formulas

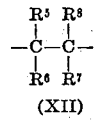

(XII)

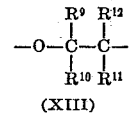

(XIII)

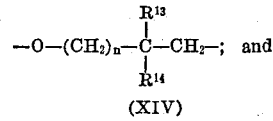

(XIV)

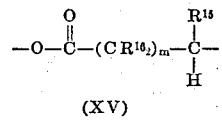

(XV)

wherein the R's are all as previously defined.

Thus, the addition polymerizable monomers can be (A) Unsaturated compounds such as olefins, e.g., ethylene, propylene, isobutylene, isoprene, and the like; vinyl monomers, e.g., acrylonitrile, vinyl chloride, vinyl fluoride, styrene, methacrylic acid, methyl methacrylate, acrylic acid, ethyl acrylate, butyl acrylate, N-vinylcarbazole, acrylamide, methacrylamide, N,N-dimethylacrylamide, vinyl acetate, methyl vinyl ether, methyl vinyl ketone, sodium styrene sulfonate, 2 - methyl - 5 - vinylpyridine, and the like; vinylidene monomers, e.g., α-methyl styrene, vinylidene chloride, vinylidene fluoride, vinylidene cyanide, and the like; 1,2-disubstituted ethylenes, e.g., fumaric and maleic esters, maleic anhydride, and the like; polymerizable perhalogenated ethylenes, e.g., chlorotrifluoroethylene, tetrafluoroethylene, and the like; conjugated diolefins, e.g., butadiene, isoprene, 2-chlorobutadiene, 2-cyanobutadiene; cyclic olefins, e.g., cyclobutene, cyclopentene, cyclohexene, norbornene, and the like;

(B) Addition polymerizable oxiranes such as ethylene oxide, propylene oxide, cis-2-butene oxide, trans-2-butene oxide, epichlorohydrin, 1,2-epoxy-3-methoxypropane, 1,2-epoxy-3-ethoxypropane, 1,2-epoxy - 3 - phenoxypropane, methyl 2,3-epoxypropionate, ethyl 2,3-epoxypropionate, tetramethylethylene oxide, styrene oxide, cyclohexene oxide, and the like;

(C) Addition polymerizable cyclic ethers such as oxetane, 3,3-bis(chloromethyl)oxetane and tetrahydrofuran; and (D) Addition polymerizable lactones such as β-propiolactone, β-butyrolactone, pivalolactone, and ε-caprolactone.

A preferred group of ethylenically unsaturated monomers that is especially useful in forming the copolymers of this invention includes compounds having the general formula $CH_2=CR^5R^6$, that is, where $R^7$ and $R^8$ are hydrogen.

The addition polymerizable monomers are polymerized by any of the procedures known in the art. In processes B and C there may be employed for polymerization of the addition polymerizable monomers free-radical generating initiators such as peroxides, azonitriles, persulfates, ultraviolet irradiation, and the like; or anionic initiators, such as alkali metal alkyls and alkoxides. In process B one may also use reagents considered as cationic initiators such as boron trifluoride, and the halides of aluminum, phosphorous and arsenic or coordination initiators, such as diisobutyl aluminum chloride with vanadium tris- (acetylacetonate), methylmagnesium bromide with titanium tetrachloride, and the like.

SPECIFIC EMBODIMENTS OF THE INVENTION

The following examples are non-limitative of the invention and all parts or percentages are by weight unless otherwise stated. Examples 1–10 utilize process A for preparing the composite polymer; Examples 11–27 utilize process B; and Examples 28–34 exemplify the use of process C.

EXAMPLE 1

Composite polymer from chloral and phenyl isocyanate monomers and ethylene / propylene / hexadiene terpolymer Chloral (160 ml.) was added to a solution of 7.2 g. of a terpolymer comprising ethylene (63.4%)/propylene (33.6%)/hexadiene (3%) ($\eta_{inh}$ 2.2, measured at 0.1 g. polymer per 100 ml. tetrachloroethylene at 30° C.) in 240 ml. of toluene. This mixture was added to a solution of 0.48 g. of freshly sublimed lithium t-butoxide in 400 ml. of toluene at room temperature. The quiescent mixture was then cooled in a −78° C. bath without stirring. After 8 minutes the mixture had gelled. The polymerization was allowed to proceed at −78° C. for 16 hours. Toluene was removed under reduced pressure and the residue allowed to react for 6 hours with 100 ml. of a 50% toluene solution of phenyl isocyanate. The preparation was then drained and the resulting block of composite polymer was washed with toluene and the toluene removed by evaporation. Yield: 153.3 g.; analysis: C, 20.38; H, 1.39; N, 0.60; Cl, 68.46. The composite contained 89 mole percent chloral, 7 mole percent phenyl isocyanate and 4 mole percent of the terpolymer noted above.

EXAMPLE 2

Composite polymer from chloral and phenyl isocyanate monomers and ethylene / propylene / hexadiene terpolymer Ethylene (63.4%) / propylene (33.6%) / hexadiene (3%) terpolymer (12 g., 29 mole percent) was dissolved in 40 ml. of toluene at 65° C. Chloral (80 ml., 64 mole percent) was added at 65° C., followed by addition of a solution of 0.16 g. of lithium tert-butoxide in 2 ml. of cyclohexane and 10 ml. of phenyl isocyanate (7 mole percent) at the same temperature of 65° C. This mixture was used to fill a warm sheet mold to make 3 mm. sheets. Polymerization was carried out by cooling to 0° C. for 1 hour under quiescent conditions and then allowing to stand at room temperature for 16 hours. The volatiles were removed from the composite polymer under reduced pressure and gave a milky opaque sheet like very stiff shoe leather. Chloral/phenyl isocyanate copolymer, similarly prepared but in the absence of the terpolymer, is a rigid material, not at all leathery.

EXAMPLE 3

Composite polymer from chloral monomer and polystyrene

Polystyrene (2 g., 8.5 mole percent) was dissolved in 20 ml. (91.5 mole percent) of chloral and at 65° C. 0.5 ml. of a 1-molar cyclohexane solution of lithium tert-butoxide was added. The solution was poured into a warm assembly to make 3 mm. sheets. The assembly was cooled to 0° C. for 1.5 hours under quiescent conditions and left for 16 hours at room temperature to complete polymerization. The film was extracted with carbon tetrachloride and dried. The film was nearly clear and showed no evidence of phase separation of polystyrene from polychloral. Infrared inspection of the composite polymer film showed bands characteristic for polystyrene in addition to bands characteristic for polychloral. The composite polymer was more fire resistant than a film of polystyrene per se.

EXAMPLE 4

Composite polymer from chloral monomer and a polyacrylate

The procedure of Example 3 was repeated except that instead of polystyrene, Acryloid® B-72 (a polyacrylate) (5 g., about 23 mole percent) was used. The polymerization conditions were otherwise the same as in Example 3. Infrared absorption by the composite polymer film showed bands characteristic for polyacrylates in addition to those characteristic for polychloral.

EXAMPLE 5

Composite polymer from chloral monomer and a blend of polyvinyl acetates

The procedure of Example 3 was repeated except that instead of polystyrene, a blend of various molecular weight polyvinyl acetates, Gelva® 1.5 (20 g., 53 mole percent) was used. The polymerization conditions were otherwise the same as in Example 3. Infrared bands typical for polyvinyl acetate were noticeable in the polychloral/polyvinyl acetate composite film.

EXAMPLE 6

Composite polymer from chloral and phenyl isocyanate monomers and poly-(N-vinylcarbazole)

Poly-(N-vinylcarbazole) (0.5 g., 9.4 mole percent) was stirred with 5 ml. of toluene at 65° C. to give a colorless, clear solution. Then 20 ml. (74 mole percent) of chloral and 5 ml. of phenyl isocyanate (16.6 mole percent) were added. The resulting solution was heated to 65° C. after which 1 ml. of 3.2% lithium tert-butoxide solution in cyclohexane was added. The homogeneous solution was poured into a warmed sheet mold to make 3 mm. sheets. Polymerization was carried out at 0° C. for 1 hour under quiescent conditions and at room temperature for 16 hours. The composite polymer film was then washed and dried.

EXAMPLES 7–10

Composite polymers prepared from chloral monomer and various addition polymers

Solutions of 1 g. of the following polymeric materials were made in 10 ml. of purified chloral at 65° C.:

Ethyl acrylate/methyl methacrylate copolymer 75/25 about 9 mole percent (Example 7);
Normal and isobutyl methacrylate polymer (Lucite® 2046, about 6.8 mole percent) (Example 8);
Poly(ethyl methacrylate) (Lucite® 2042, about 8 mole percent) (Example 9); and
Polystyrene (Forrestane® 50 D, 8.6 mole percent) (Example 10).

To each of these solutions was added 0.5 ml. of 3.2% lithium tert-butoxide solution in cyclohexane. For polymerization, the uniform mixtures were cooled in a 0° C. bath for 1 hour under quiescent conditions and then held 16 hours at room temperature. Uniform polymer plugs were obtained with no evidence of incompatibility of the two polymers in the composite polymers.

EXAMPLE 11

Composite polymer from polychloral and N-vinylcarbazole monomer

A 50 x 80 mm. piece (0.1 mm. thick) of polychloral film was prepared by putting chloral containing 0.2 mole percent of triphenyl phosphine in a warm sheet mold, cooling to −20° C. for 1 hour under quiescent conditions, and then holding at room temperature for 16 hours. The film of polychloral was then boiled for 3 hours with a carbon tetrachloride solution of phosphorus pentachloride and washed with carbon tetrachloride. Then it was soaked in a dichloroethane solution of N-vinylcarbazole.

Still wet, the film strip was held in $BF_3$ etherate (diethyl ether) vapor for 5 minutes and then in a dichloroethane solution of $BF_3$ etherate for about 0.5 hour to polymerize the N-vinylcarbazole. The film was then washed twice with dichloroethane and twice again with boiling dichloroethane. The film was rubbed hard with a paper towel to remove any poly(N-vinylcarbazole) from the surface, then dried and ironed flat. The infrared spectrum showed new bands characteristic for poly(N-vinylcarbazole) as well as bands for polychloral. Analysis: N, 0.97, corresponding to 13.3 weight percent (11 mole percent) of poly(N-vinylcarbazole) incorporated. The composite polymer film was photoconductive and gave an image. A polychloral film was not photoconductive and gave no image.

Photoconductivity was shown as follows. The film was electrostatically charged and placed above and adjacent to a grounded metal plate. A focussed high intensity light image of a photographic negative was flashed onto the film from above. In the photoconductive film the areas of the image struck by light were discharged to the ground. When treated with an electrostatic toner the film picked up toner only in the undischarged areas. This gave a positive image which was transferred to paper and fixed thereon by heating.

EXAMPLE 12

Composite polymer prepared from polychloral and methyl methacrylate monomer

Film preparation: A polychloral film was prepared by mixing chloral with 0.2 mole percent of triphenyl phosphine at 65° C. and pouring the mixture into a warm sheet mold to prepare 0.1 mm. films. The assembly was cooled to −50° C. for 1 hour under quiescent conditions and then held at room temperature for 16 hours to complete polymerization. The mold assembly was opened and the polychloral film taken out, trimmed, and boiled for 3 hours in a saturated solution of $PCl_5/CCl_4$, washed with $CCl_4$, air-dried, washed with water, and again air-dried. The film was dried further in a vacuum at 0.001 mm. at room temperature.

Four film strips of the above polychloral film (48 mm. x 7 mm., weight 0.281 g.) were placed in a test tube and fully covered with methyl methacrylate monomer which was allowed to imbibe into the polychloral strips. Nitrogen was passed through the liquid and the tube was stoppered. The test tube was placed in a water bath at 85° C. and the bath allowed to cool to room temperature overnight, thus allowing the methyl methacrylate to polymerize. Initial washing of the films was done with four changes of 100 ml. of $CHCl_3$, boiling for 10 minutes each, and drying for 4 hours under reduced pressure to remove the polymerized methyl methacrylate that was not held within the polychloral.

The composite film was analyzed (C, 19.90; H, 1.36%) and showed the incorporation of 12 mole percent of poly(methyl methacrylate). The infrared spectrum of the film showed a strong carbonyl band at 5.83 microns which is characteristic of poly(methyl methacrylate).

EXAMPLES 13 TO 20

Composite polymers from chloral/p-chlorophenyl isocyanate copolymer and various monomers Addition polymerizable monomers were imbibed in test pieces of chloral/p-chlorophenyl isocyanate (95/5 mole percent) copolymers. The chloral copolymer pieces were prepared in the following way: Chloral (140 ml.) and p-chlorophenyl isocyanate (9.3 ml.) were heated under nitrogen to 55° C. Then 6 ml. of 1-molar triphenyl phosphine in benzene was added to form a uniform mixture. This mixture was added to a warm (55° C.) sheet mold assembly to make 3 mm. sheets. The assembly was cooled to 0° C. for 1 hour without stirring or agitation and held at room temperature for 16 hours. The resulting chloral copolymer sheet was taken out of the mold assembly and baked for 1 hour at 120° C. (weight loss 9%) and extracted with acetone. Total weight loss was 21%. The sheets were dried and cut into pieces 125 mm. x 12 mm. x 3 mm. Pairs of these pieces were soaked in a series of test tubes each tube containing 50 ml. of one of the monomers listed in Table I and also containing 0.1 g. $\alpha,\alpha'$-azodiisobutyronitrile. The test tubes and their contents were held under nitrogen for 16 hours at room temperature to polymerize the monomer. In most cases the monomer polymerized completely and entirely encased the chloral copolymer. The surrounding homopolymer was mechanically removed as much as possible to free the chloral copolymer pieces. These pieces were then extracted exhaustively with acetone in a Soxhlet extractor for 72 hours. (All of the homopolymers were soluble in acetone.) The results are summarized in Table I.

EXAMPLES 21 AND 22

Composite polymers from chloral/p-chlorophenyl isocyanate copolymer with styrene or alpha-methyl styrene monomer Using the general procedure of Examples 13 to 20, composites were prepared with styrene (Example 21) and $\alpha$-methylstyrene (Example 22). In these two cases, benzene was used as the extracting solvent for excess homopolymer of styrene and $\alpha$-methylstyrene which are soluble in benzene but not in acetone. Results are also summarized in Table I.

TABLE I

| Example | Monomer | Percent weight gain | Analysis C | H | N | Addition polymer mole percent in composite polymer | Izod impact, ft. lb./in.² | Tensile strength, p.s.i. | Percent elongation | Flexural modulus, p.s.i. |
|---|---|---|---|---|---|---|---|---|---|---|
| 13 | Acrylonitrile | 24.7 | 26.98 | 1.71 | 4.77 | 18 | | | | |
| 14 | Methacrylic acid | 7.7 | 27.19 | 2.40 | | 23 | | | | |
| 15 | Methyl acrylate | 37.1 | 28.87 | 2.73 | | 28 | 0.31 | 2,210 | 10.4 | |
| 16 | do | 35.1 | 27.58 | 2.48 | | 25 | 0.29 | ¹5,680 | 15.7 | 174,000 |
| 17 | Methyl methacrylate | 33.1 | 30.32 | 3.23 | | 29 | 0.31 | | | 5 |
| 18 | Butyl methacrylate | 14.5 | 24.73 | 2.09 | | 13 | 0.29 | 3,480 | 2.8 | |
| 19 | 2-ethylhexyl methacrylate | 4.7 | 23.41 | 1.51 | | 10 | 0.29 | 2,630 | 1.8 | |
| 20 | do | | 19.83 | 1.27 | | 3 | 0.68 | ¹9,110 | | 29,000 |
| 21 | Styrene | 35.9 | 39.61 | 2.83 | | 29 | | | | |
| 22 | $\alpha$-Methyl styrene | 5.0 | 22.69 | 1.28 | | 6 | 0.37 | 2,560 | 2.1 | |

¹ Flexural strength in p.s.i.

EXAMPLE 23

Composite polymer from polychloral and isoprene monomer

In a test tube two pieces of chloral/p-chlorophenyl isocyanate 95/5 copolymer, 125 mm. x 12 mm. x 3 mm., were soaked in 50 ml. of freshly distilled isoprene. The air was replaced by passing nitrogen through the solution and the tube closed with a rubber stopper. After standing at room temperature for one day, 0.1 g. of $\alpha,\alpha'$-azobisisobutyronitrile was added. The tube and its contents were then allowed to stand at room temperature for 24 more days during which time the isoprene polymerized. After extraction with benzene and drying, the weight gain was 20.5%. Analysis: C, 29.86; H, 2.59; the amount of polyisoprene was calculated as 16 mole percent.

EXAMPLE 24

Composite polymer from the chloral/p-chlorophenyl isocyanate copolymer and chloroprene monomer In a test tube two pieces of 95/5 (mole percent) copolymer of chloral and p-chlorophenyl isocyanate were placed in 70 ml. of chloroprene. Nitrogen was passed through the liquid for 1 hour and the test tube closed with a rubber stopper. After standing at room temperature for three days the polymerization of the chloroprene was complete and the size of the chloral copolymer piece had increased from its original dimensions of 125 mm. x 12 mm. x 3 mm. to 260 mm. x 25 mm. x 5 mm. and had become very flexible. The composite polymer samples were taken out and soaked in three changes of benzene in four days. One sample was extracted with benzene in a Soxhlet extractor for 20 hours and dried at 50° C./1 mm. for 20 hours. The sample was tough and leathery. Weight gain 91%; analysis: C, 38.36; H, 3.51; Cl, 53.61; polychloroprene calculated, 52–55 mole percent.

EXAMPLE 25

Composite polymer from chloral/p-chlorophenyl isonate copolymer and 2,3-dichlorobutadiene monomer In a test tube two pieces of 95/5 mole percent copolymer of chloral and p-chlorophenyl isocyanate were placed in 50 ml. of 2,3-dichlorobutadiene. Nitrogen was passed through this solution for 1 hour to replace the air, and the test tube was then closed with a rubber stopper. After three days the polymerization of the diene was essentially complete and the samples were taken out, extracted with benzene and dried as above. Percent weight gain: 4.1%. Analysis: C, 20.44; H, 1.27; poly(2,3-dichlorobutadiene) incorporated calculated: 9 mole percent.

EXAMPLE 26

Composite polymer from chloral/p-chlorophenyl isocyanate copolymer and 2-ethylhexyl vinyl ether monomer In a test tube three bars of 95/5 mole percent copolymer of chloral and p-chlorophenyl isocyanate were placed in 50 ml. of freshly distilled 2-ethylhexyl vinyl ether for 16 hours to soak the ether into the chloral copolymer. The samples were taken out, wiped superficially and placed in a dry test tube which contained 0.5 ml. of $BF_3$ etherate in the bottom to polymerize the vinyl ether. After 30 minutes exposure to the $BF_3$ etherate vapor the bars were taken out, Soxhlet extracted for 24 hours with acetone and dried. Weight gain: 5%. Analysis: C, 24.84, 24.60; H, 2.08. These analyses correspond to 11 mole percent poly(2-ethylhexyl vinyl ether) incorporation. Izod impact in ft. lb./in., 0.75; flexural strength/p.s.i., 9540; flexural modulus/p.s.i., 280,000.

EXAMPLE 27

Composite polymer from chloral/p-chlorophenyl isocyanate copolymer and propiolactone monomer In a test tube two bars of 95/5 mole percent chloral/p-chlorophenyl isocyanate copolymer were placed in 50 ml. of freshly distilled propiolactone for 16 hours to inbibe the monomer into the polymer. The samples were taken out, wiped superficially and placed in a dry test tube which contained 0.5 ml. of tributyl phosphine for 2 hours during which time the propiolactone polymerized. The samples were then extracted with acetone for 24 hours and dried at 50° C./1 mm. Analysis: C, 20.20; H, 1.18. Calculated polypropiolactone incorporation, 7 mole percent. Izod impact in ft. lb./in., 0.40; flexural strength in p.s.i., 8000; percent elongation, 1.6%; flexural modulus in p.s.i., 267,000.

Untreated 95/5 mole percent polymer which had been used for these experiments had the following properties: Izod impact, 0.40; flexural strength, 10,000 p.s.i.; percent elongation 1.3%; flexural modulus in p.s.i., 350,000.

EXAMPLES 28–33

Composite polymers prepared from chloral and p-chlorophenyl isocyanate monomers and various addition-polymerizable monomers In the following experiments, chloral was mixed with various addition-polymerizable monomers above the threshold temperature of polymerization of chloral. Chloral polymerizations and copolymerizations were carried out first and then followed by activation of the initiator for the polymerization of the other monomer.

Cholral (140 ml.), p-chlorophenyl isocyanate (9.3 ml., 5 mole percent), the free-radical initiator, if used, and the other monomer, as indicated in Table II, were mixed together. The mixture was heated to 50° C. which is above the threshold polymerization temperature of the chloral component, and 6.0 ml. of a 1-molar solution of triphenylphosphine in benzene was added to make a uniform mixture. This mixture was quickly added to a plate mold assembly to make 3 mm. thick sheets. The mixture was held only briefly at 50° C. in order to minimize any polymerization of the addition monomer at this stage of the process. The mold assembly was colled to 0° C. for 1½ hours without agitation of its contents and then allowed to stand for 16 hours overnight to cause the chloral copolymerization.

The mold assembly was then heated in an oven to 50° C. for 4 hours and to 60° C. for an additional 4 hours to polymerize the other monomer. The assembly was opened, the polychloral copolymer/addition polymer composite sheet was heated for 1 hour at 120° C. and was extracted for 90 hours with acetone, and dried at 50°/1 mm. for 16 hours. The data are presented in Table II.

When pivalolactone, β-butyrolactone or ε-caprolactone are substituted for β-propiolactone in the procedures of Examples 27 or 29, the corresponding composites of chloral/p-chlorophenyl isocyanate with polypivalolactone, polybutyrolactone, or polycaprolactone are obtained.

TABLE II

| Example | Additive | Percent by volume | | | Analysis, percent | | Mole percent additive in product |
|---|---|---|---|---|---|---|---|
| | | Chloral | p-Chlorophenyl isocyanate | Other monomer | C | H | |
| 28 | Methyl acrylate (15 ml.) Vazo® [1] (50 mg.) | 86.2 | 5.0 | 8.8 | 20.87 | 1.34 | 7 |
| 29 | Propiolactone (15 ml.) | 84.7 | 4.9 | 11.4 | 19.99 | 1.18 | 5 |
| 30 | Methyl methacrylate (15 ml.) Vazo® [1] (0.1 mg.) | 85.5 | 5.0 | 9.5 | 21.15 | 1.44 | 8 |
| 31 | Styrene (16 ml.), Vazo® [1] (0.1 g.) | 86.2 | 5.0 | 8.8 | 22.04 | 1.35 | 5 |
| 32 | N-vinylcarbazole (20 g.) | 88.8 | 5.1 | 6.1 | 25.69 | 1.45 | 11 |
| 33 | N-vinylcarbazole (6 g.) | 92.7 | 5.4 | 1.9 | 22.65 | 1.47 | 7 |
| Standard | None | 95.0 | 5.0 | 0 | | | 0 |

[1] A,A′-Azodiisobutyronitrile.

EXAMPLE 34

Composite polymer from chloral and N-vinylcarbazole monomers

N-vinylcarbazole (3 g., 7 mole percent) was dissolved in 20 ml. (93 mole percent) of chloral and the mixture heated to 60° C. Lithium-tert-butoxide (0.4 ml. 1-molar solution in cyclohexane) was added. An immediate polymerization of the N-vinylcarbazole occurred with increase of solution viscosity. The chloral polymerization was accomplished by placing the mixture in a film mold assembly (space 0.1 mm.), cooling the mold assembly to 0° C. for 1 hour without agitation, and then allowing to stand at room temperature for 16 hours. The mold assembly was opened, the film exhaustively extracted with carbon tetrachloride and dried. Analysis: C, 23.17; H, 1.11; N, 0.85% indicating an incorporation of 9 mole percent of N-vinylcarbazole in 91 mole percent of chloral. Infrared analysis showed a strong band in the aromatic region at 6.25 microns.

EXAMPLE 35

Composite polymer from chloral/diphenyl ketene/p-chlorophenyl isocyanate copolymer and styrene monomer Part A.—In a dry 500-ml. Erlenmeyer flask which was blanketed with nitrogen, a mixture of 210 g. (1.4 moles, 92 mole percent) of freshly distilled chloral, 0.2 g. (0.05 mole, 3 mole percent) of diphenyl ketene, and 11.6 g. (0.175 mole, 5 mole percent) of p-chlorophenyl isocyanate was heated to 55° C. A 1-molar solution of triphenyl phosphine in benzene (6.0 ml.) was then added. One part of the warm mixture was placed in a warm, dry test tube, blanketed with nitrogen, and the tube was cooled to 0° C. without agitation. Polymerization commenced almost immediately. The polymerization was essentially complete in 1 hour. The tube containing the terpolymer was then allowed to come to room temperature. The plug of chloral/diphenyl ketene/p-chlorophenyl isocyanate terpolymer was removed from the test tube, extracted for 90 hours with acetone to remove monomers and initiator residues and dried for 16 hours at 60° C./1 mm. Analysis found: C, 19.43; H, 0.98; N, 0.42. This corresponds to a chloral/diphenyl ketene/p-chlorophenyl isocyanate molar ratio of 93.5/1.5/5.0 for which the calculated analysis is C, 19.65; H, 0.86; N, 0.47.

Part B.—The other part of the warm mixture of comonomers and initiator was transferred at temperatures above 55° C. to a mold formed by two glass plates separated by a rubber tubing to make a spacing of approximately 3 mm. The assembly was then cooled to 0° C. without agitation for about one hour. A clear sheet of chloral/diphenyl ketene/p-chlorophenyl isocyanate terpolymer was obtained which was stiff and tough. The polymer was extracted with acetone as described in Part A and analyzed. Found: C, 19.49; H, 0.96; N, 0.45. According to the analysis the terpolymer contained 1.5 mole percent of diphenyl ketene, 5 mole percent of p-chlorophenyl isocyanate, and 93.5 mole percent of chloral. The infrared spectrum (mineral oil mull) showed a strong band at $5.70\mu$ indicative of a urethane linkage and a weaker but well separated band at $5.85\mu$ indicative of an ester linkage.

Using the procedure of Example 21, strips of the terpolymer sheeting prepared in Part B above are allowed to imbibe monomeric styrene containing 0.1 g. of $\alpha,\alpha'$-azodiisobutyronitrile/50 ml. and then the styrene is polymerized at room temperature to obtain a composite of the terpolymer with polystyrene.

EXAMPLE 36

Composite polymer from chloral/p-chlorophenyl isocyanate copolymer and propylene oxide monomer In a test tube was placed 10 ml. of freshly distilled propylene oxide at 25° C. Then 0.05 ml. of $BF_3$·etherate and a bar (125 mm. x 12.5 mm. x 3 mm.) of methanol-extracted 95:5 copolymer of chloral and p-chlorophenyl isocyanate (prepared as in Example 13) was immersed therein. The polymerization of propylene oxide was allowed to proceed for 24 hours at 25° C. The viscous polymer solution was drained, and the polymer bar was washed in acetone to remove excess polypropylene oxide and dried at 60° C. for 16 hours at 1 mm. The composite polymer bar showed improved toughness over the original bar of chloral/p-chlorophenyl isocyanate copolymer. Weight gain was 13.2%. Elemental analysis.—Found: C, 21.32; H, 1.49. Calculated for a chloral/p-chlorophenyl isocyanate 95:5 copolymer composition containing 24 mole percent polypropylene oxide: C, 21.36; H, 1.75.

EXAMPLE 37

Composite polymer from chloral/p-chlorophenyl isocyanate copolymer and epichlorohydrin monomer The procedure of Example 36 was repeated using freshly distilled epichlorohydrin (10 ml.) instead of propylene oxide. After work-up and drying as described in Example 36, the composite bar of chloral/p-chlorophenyl isocyanate 95:5 copolymer with polyepichlorohydrin showed a weight gain of 16%. The sample was substantially tougher than the chloral copolymer sample which had not been treated with epichlorohydrin. Elemental analysis.— Found: C, 21.48; H, 1.50. The carbon, hydrogen analysis for a 95:5 chloral/p-chlorophenyl isocyanate copolymer composition containing 31 mole percent epichlorohydrin calculates: C, 21.25; H, 2.16.

EXAMPLE 38

Composite polymer from chloral/p-chlorophenyl isocyanate copolymer and methyl methacrylate monomer In an Erlenmeyer flask which was flamed out and cooled under dry nitrogen were placed chloral (70 ml., 105 g., 50.8 mole percent), p-chlorophenyl isocyanate (4 ml., 4.8 g., 2.2 mole percent), methyl methacrylate (70 ml., 65.8 g., 47.0 mole percent), and 0.7 g. of azobisisobutyronitrile. This mixture was heated briefly in an oil bath to 55° C. and then 5 ml. of a 1-molar benzene solution of triphenyl phosphine (0.67 mole percent with respect to the sum of the comonomers) was quickly stirred in until incorporated. The hot mixture was then quickly transferred with a hot syringe into a hot assembly of two glass plates which were separated with gum rubber 3 mm. thick and held together with clamps. The assembly was quickly cooled in an ice-water bath to effect the copolymerization of chloral and p-chlorophenyl isocyanate. At this point substantially all of the methyl methacrylate remained in monomeric form distributed uniformly in the chloral/p-chlorophenyl isocyanate copolymer. After 1 hour, the assembly containing the solid sheet was taken out of the ice bath and allowed to stand at ambient temperature for 16 hours. To effect the polymerization of the methyl methacrylate, the assembly was placed in an oven for 2 hours at 60° C. and 2 more hours at 65° C. Crude composite copolymer sheet, 120 g. (66%), was obtained. This polymer analyzed for 51.5 mole percent of chloral, 3.9% of p-chlorophenyl isocyanate, and 4.6 mole percent of methyl methacrylate.

*Analysis.*—Calcd. (percent): C, 33.50; H, 3.37; N, 0.43. Found (percent): C, 33.28; H, 2.99; N, 0.43.

A portion of the polymer (82 g.) was extracted with three portions of 200 ml. of acetone by gently boiling for 1 hour each. This separated the polymer into acetone-soluble and acetone-insoluble fractions. The first extract gave 16 g. (18.8%) of composite polymer after precipitation with 300 ml. of methanol. It analyzed for 13.3 mole percent of chloral, 2.7% of p-chlorophenyl isocyanate, and 83.9 mole percent of methyl methacrylate.

*Analysis.*—Calcd. for this composition (percent): C, 51.88; H, 6.49; N, 0.49. Found (percent): C, 51.70; H, 6.62; N, 0.49.

The second acetone extract gave, after precipitation with methanol, 2.7 g. (3.2%) of composite polymer and the third extract gave 0.77 g. (0.90%) of composite polymer after precipitation with methanol. All three soluble polymer fractions gave similar infrared absorption spectra much like polymethylmethacrylate.

The acetone insoluble polymer (45 g., 54.9%) was dried at 60° C. for 16 hours at 1 mm. and analyzed for 60.7 mole percent chloral, 1.7 mole percent of p-chlorophenyl isocyanate, and 37.6 mole percent of methyl methacrylate.

*Analysis.*—Calcd. (percent): C, 29.71; H, 3.32; N, 0.23. Found (percent): C, 28.71; H, 3.49; N, 0.25.

EXAMPLE 39

Composite polymer from chloral/p-chlorophenyl isocyanate copolymer and ethylene/propylene/1,4-hexadiene terpolymer In 140 cc. of chloral, 11.3 g. of ethylene (63.4%)/propylene (33.6%)/1,4-hexadiene (3%) terpolymer (Nordel® 1320) was dissolved by stirring overnight. To this solution there was added 9.3 cc. of p-chlorophenyl isocyanate, 105.7 g. of powdered filler ($Al_2O_3 \cdot 3H_2O$) and 2.25 g. of ferric oxide pigment (R.C. No. 1630 Red). The mixture was heated to 55° C., 60 ml. of a 1-molar solution of triphenylphosphine in benzene was added and the mixture was stirred at 55° C. until uniform. A mold was prepared from two highly polished nickel plates spaced 3 mm. apart with a rubber gasket and preheated to 65° C. The mold was filled with the hot mixture. With the charge quiescent the mold and contents were cooled to 0° C. for one hour to effect polymerization. The sheet was removed from the mold, extracted for 24 hours with acetone and dried under vacuum for 2.5 hours at 65° C. to remove benzene, catalyst residues and unpolymerized monomers. The weight loss was 13.5%. The resulting tile-colored sheet had an elongation at break of 2%, a flexual modulus of 420,000 p.s.i. and an Izod impact strength of 0.53 ft. lb./in. It was highly useful as a roofing tile.

EXAMPLE 40

Composite polymers from chloral/p-chlorophenyl isocyanate 95/5 copolymers and methyl methacrylate (59.3 vol. percent; 54.5 wt. percent)

A solution of 77 ml. of chloral, 5.1 ml. of p-chlorophenyl isocyanate, 3.3 ml. of 0.5 molar LiCl in dimethylformamide, 125 ml. of methyl methacrylate, and 250 mg. of azo(bis)isobutyronitrile were mixed at 54° C. for 98 seconds, transferred to a warm cell (formed by two Pyrex glass plates, separated 3 mm. by rubber tubing), sealed, and immersed in an ice bath for 2 hours. The cell was then warmed at 50° C. for 28 hours and at 100–110° C. for 1 hour and opened. A tough, almost clear plastic sheet of chloral/p-chlorophenyl isocyanate copolymer composite with poly(methyl methacrylate) resulted. It had no odor of monomers or solvent.

*Analysis.*—(Percent): C, 40.41; H, 4.82; Cl, 33.93; N, 0.49.

Near-infrared analysis showed 6.5 wt. percent unreacted chloral and no unreacted methyl methacrylate. The limiting oxygen index was 0.203 as compared to a value of 0.17 for poly(methyl methacrylate). Thermal gravimetric analysis showed 5% wt. loss at 222° C. and 50% wt. loss at 290° C. The sample did not distort appreciably at 110° C., illustrating a higher heat distortion temperature than poly(methyl methacrylate).

EXAMPLE 41

The procedure of Example 40 was repeated except that 42.1 vol. percent of methyl methacrylate was used and the LiCl solution was 0.25 molar. The resulting tough, clear plastic sheet was self-extinguishing when burning was attempted in a Bunsen gas flame.

When the following isocyanates, diisocyanates, isothiocyanates and diisothiocyanates are used in place of phenyl isocyanate in the procedure of Example 6 or in place of p-chlorophenyl isocyanate in the procedures of Examples 13–22 and 24–33, corresponding chloral/isocyanate compositions are obtained.

methoxydifluoromethyl isocyanate;
1,1-dimethyl-2-(4-ethylphenyl)ethyl isocyanate;
2-benzo[b]thien-3-yl-1-methylethyl isocyanate;
1,5-naphthylene diisocyanate;
p-[bis-(2-chloroethyl)amino]phenyl isocyanate;
ethoxycarbonylmethyl isocyanate;
3-cyano-1-methyl-3,3-diphenylpropyl isocyanate;
o-cyanophenyl isocyanate;
1-diethylamino-1,2,2-trifluoroethyl isocyanate;
α,α-dimethylphenethyl isocyanate;
heptafluoropropyl isocyanate;
2-iodo-1-indanyl isocyanate;
cis,cis-9,12-octadecadienyl isocyanate;
4-phenylanthryl isocyanate;
2,6-anthraquinonylene diisocyanate;
3-benzyloxy-4-methoxyphenethyl isocyanate;
1-cyclohexenyl isocyanate;
trifluoromethyl isocyanate;
1,2,3,4,4a,9,10,10a-octahydro-7-isopropyl-1,4a-dimethyl-1-phenanthryl isocyanate;
2,4,6-triiodophenyl isocyanate;
abietyl isocyanate;
6-fluoro-2-pyridyl isocyanate;
styryl isocyanate;
1-phenylvinyl isocyanate;
1,3-butadienylene diisocyanate;
1-adamantyl isocyanate;
3,3,3-trinitropropyl isocyanate;
2-(phenylthio)ethyl isocyanate;
p-phenylazophenyl isocyanate;
allyl isothiocyanate;
benzyl isothiocyanate;
butyl isocyanatoacetate;
p-bromophenyl isothiocyanate;
p-butoxyphenyl isothiocyanate;
o-chloro-α-phenylbenzyl isothiocyanate;
14-cyanotetradecyl isothiocyanate;
cyclohexyl isothiocyanate;
cyclooctyl isothiocyanate;
2-diethylaminoethyl isothiocyanate;
2,2-difluoroethyl isothiocyanate;
2,4-dinitrophenyl isothiocyanate;
ethylene diisothiocyanate;
p-iodophenyl isothiocyanate;
4-methylthiobutyl isothiocyanate;
p-phenylene diisothiocyanate;
2-pyridyl isothiocyanate;
p-(methylthio)phenyl isothiocyanate; and
9-phenanthryl isothiocyanate.

When the following ketenes are substituted for p-chlorophenyl isocyanate in the procedure of Examples 13 to 20, corresponding chloral/ketene addition polymer composites are obtained.

ketene
methylketene
dimethylketene
phenoxyketene;
p-chlorophenoxyketene;
2,4-dichlorophenoxyketene;
2,4,6-trichlorophenoxyketene;
diphenoxyketene;
bis(p-biphenylyl)ketene;
di-p-tolylketene;
dimesitylketene;
dodecylethylketene;
durylphenylketene;
tetradecylketene;
octadecylketene;
benzylmethylketene;
cyclohexylketene;
dimethyleneketene (carbonylcyclopropane);
tetramethyleneketene (carbonylcyclopentane);
isopropenylketene;
vinylketene;
diallylketene;
7-hexadecenylketene;
(1-naphthyl)phenylketene;
3,3,3-trichloropropylketene;
p-methoxyphenylketene;

dicyanoketene (carbonylmalononitrile); (ethoxycarbonyl)ketene (ethyl 3-oxoacrylate); and (ethoxycarbonyl)-p-tolylketene(ethyl 3-oxo-2-p-tolylacrylate).

When the following oxiranes or cyclic ethers are substituted for propylene oxide in the procedure of Example 36 or for epichlorohydrin in the procedure of Example 37 the corresponding composites of chloral/p-chlorophenyl isocyanate copolymer with polymers of the indicated oxiranes or cyclic ethers are obtained.

ethylene oxide (under pressure)
cis-2-butene oxide
trans-2-butene oxide
1,2-epoxy-3-methoxypropane
1,2-epoxy-3-ethoxypropane
1,2-epoxy-3-phenoxypropane
methyl 2,3-epoxypropionate
ethyl 2,3-epoxypropionate
tetramethylethylene oxide
styrene oxide
cyclohexene oxide
oxetane
3,3-bis(chloromethyl)oxetane
tetrahydrofuran.

What is claimed is:

1. A single-phase composite polymer comprising a chloral polymer and an addition polymer which are separately formed but inseparable polymers and which are chemically linked to each other to the extent of less than 10% by weight of the composite polymer, wherein the chloral polymer is chloral homopolymer or a copolymer of chloral and at least one comonomer selected from the group consisting of $$R^3\text{—}N\text{=}C\text{=}X, \text{ and } X\text{=}C\text{=}N\text{—}R^4\text{—}N\text{=}C\text{=}X$$

wherein

X is selected from the group consisting of oxygen and sulfur;

$R^3$ is selected from the group consisting of nonsubstituted and substituted alkyl, cycloalkyl, and alkenyl of up to 18 carbons, aryl of 6–18 carbons and alkaryl and aralkyl of 7–24 carbons, any substitution being selected from the group consisting of fluorine, chlorine, bromine, iodine, nitro, cyano, phenylazo, —$NY_2$, —OY, —SY,

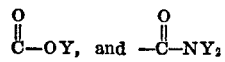

in which Y is lower alkyl or phenyl;

$R^4$ is selected from the group consisting of nonsubstituted and substituted alkylene, alkenylene, alkadienylene, alkarylene, aralkylene, cycloalkylene, alkylenebis(cycloalkylene), alkylenebis(arylene), arylene, arylenebis(alkylene) of up to 18 carbons and anthraquinonylene, any substitution being selected from the group consisting of fluorine, chlorine, bromine, iodine, nitro, cyano, phenylazo, —$NY_2$, —OY, —SY,

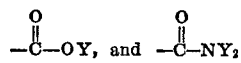

in which Y is lower alkyl or phenyl;

and wherein the addition polymer is a polymer of at least one monomer having the formula

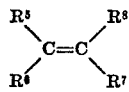

wherein $R^5$ is hydrogen, halogen, lower alkyl, lower alkenyl, phenyl, lower alkoxy, lower alkylcarbonyl, carboxy, lower alkoxycarbonyl, lower alkylcarbonyloxy, cyano, carbamoyl, carbazolyl, or N,N-di(lower alkyl)carbamoyl;

$R^6$ is hydrogen, halogen, lower alkyl, vinyl, halovinyl, lower alkyl vinyl, cyano, methylpyridinyl, or phenylene sodium sulfonate;

$R^7$ is hydrogen, halogen, carboxy or lower alkoxycarbonyl, with the proviso that $R^6$ and $R^7$ taken together may be an alkylene group of 1 to 6 carbon atoms; and $R^8$ is hydrogen or halogen.

2. The polymer of claim 1 in which the comonomer reacted with chloral to form the chloral polymer composite is $R^3\text{—}N\text{=}C\text{=}X$.

3. The polymer of claim 1 in which the comonomer reacted with chloral to form the chloral polymer composite is $X\text{=}C\text{=}N\text{—}R^4\text{—}N\text{=}C\text{=}X$.

4. The polymer of claim 1 in which the addition polymer is poly-N-vinylcarbazole.

5. The polymer of claim 1 in which the addition polymer is polyethyl acrylate.

6. The polymer of claim 1 in which the addition polymer is polychloroprene.

7. The polymer of claim 1 in which the addition polymer is a terpolymer of ethylene, propylene and 1,4-hexadiene.

8. The polymer of claim 1 of chloral/N-vinylcarbazole.

9. The polymer of claim 1 of chloral/p-chlorophenyl isocyanate/methyl acrylate.

10. The polymer of claim 1 of chloral/p-chlorophenyl isocyanate/methyl methacrylate.

11. The polymer of claim 1 of chloral/p-chlorophenyl isocyanate/chloroprene.

12. The polymer of claim 1 containing a pigment.

13. The polymer of claim 1 in the form of a fiber.

14. The polymer of claim 1 in the form of a film.

15. The polymer of claim 1 in the form of a sheet.

16. The polymer of claim 1 of chloral/ethylene/propylene/1,4-hexadiene containing a pigment.

17. The polymer of claim 16 containing aluminum oxide trihydrate and red ferric oxide.

18. The cryotachensic polymerization process of forming a single-phase composite polymer of claim 1 comprising dissolving, at a temperature above the threshold polymerization temperature of the chloral component, a preformed addition polymer prepared from at least one monomer having the formula

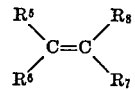

in a liquid comprising chloral alone or chloral and at least one monomer selected from the group consisting of $$R^3\text{—}N\text{=}C\text{=}X \text{ and } X\text{=}C\text{=}N\text{—}R^4\text{—}N\text{=}C\text{=}X$$

said liquid containing an anionic polymerization initiator for the said chloral component and cooling the thus prepared liquid solution below the threshold polymerization temperature of the chloral component to effect polymerization under quiescent conditions, wherein $R^3$, $R^4$, $R^6$, $R^8$ and X are as previously defined in claim 1, $R^5$ is hydrogen, halogen, lower alkyl, lower alkenyl, phenyl, lower alkoxy, lower alkylcarbonyl, lower alkoxycarbonyl, lower alkylcarbonyloxy, cyano, carbamoyl, carbazolyl, or N,N-di(lower alkyl)-carbamoyl, and $R^7$ is hydrogen, halogen, or lower alkoxycarbonyl, with the proviso that $R^6$ and $R^7$ taken together may be an alkylene group of 1 to 6 carbon atoms.

19. The process of forming a single-phase composite polymer of claim 1 comprising
uniformly imbibing
a preformed chloral polymer prepared from chloral alone or chloral and at least one monomer selected from the group consisting of $R^3-N=C=X$ and $X=C=N-R^4-N=C=X$ with at least one monomer of the formula

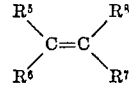

wherein
$R^3$ through $R^8$ and X are as previously defined in claim 2, and
with an initiator for the polymerization of said monomer, and
causing the said monomer to polymerize under quiescent conditions.

20. The process of forming a single-phase composite polymer of claim 1 comprising preparing, at a temperature above the threshold polymerization temperature of the chloral component, a uniform solution of
(a) a chloral component,
(b) an anionic initiator for the polymerization of the chloral component,
(c) an addition-polymerizable component,
(d) an initiator for the polymerization of said addition-polymerizable component, and then carrying out under quiescent conditions the following two steps in any order;
(1) cooling the uniform solution below the threshold polymerization temperature of the chloral component to polymerize it, and
(2) causing the addition-polymerizable component to polymerize,
the said chloral component comprising chloral alone or chloral and at least one monomer selected from the group consisting of $R^3-N=C=X$ and $X=C=N-R^4-N=C=X$ the said addition polymerizable component being at least one monomer of the formula

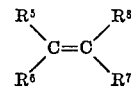

wherein
$R^3$, $R^4$, $R^6$, $R^8$ and X are as previously defined in claim 1,
$R^5$ is hydrogen, halogen, lower alkyl, lower alkenyl, phenyl, lower alkoxy, lower alkylcarbonyl, lower alkoxycarbonyl, lower alkylcarbonyloxy, cyano, carbamoyl, carbazolyl, or N,N-di(lower alkyl)-carbamoyl, and
$R^7$ is hydrogen, halogen, or lower alkyloxycarbonyl, with the proviso that $R^6$ and $R^7$ taken together may be an alkylene group of 1 to 6 carbon atoms.

References Cited

UNITED STATES PATENTS

| | | | |
|---|---|---|---|
| 3,265,665 | 8/1966 | Mantell et al. | 260—67 |
| 3,350,359 | 10/1967 | Yoshioka et al. | 260—67 |
| 3,454,527 | 7/1969 | Vogl | 260—67 |

FOREIGN PATENTS

| | | | |
|---|---|---|---|
| 1,027,148 | 4/1966 | Great Britain | 260—874 |

OTHER REFERENCES

Takida et al., Kobunshi Kagaku (Chemistry of High Polymers, Japan) 22, pp. 463–72, July 1965.

Bamford et al., Mechanism of the Initiation of Polymerization by Metal Carbonyl-Halide Systems, Trans. Faraday Soc., 60 (1964) pp. 751–758.

MURRAY TILLMAN, Primary Examiner

J. SEIBERT, Assistant Examiner

U.S. Cl. X.R.

117—137, 161; 204—159.14, 159.15, 159.16, 159.17, 159.19, 159.21, 159.22; 260—30.6 R, 30.8 DS, 32.4, 32.6 R, 32.6 A, 32.6 N, 32.6 PQ, 32.8 R, 32.8 A, 32.8 N, 32.8 EP, 33.2 R, 33.2 EP, 33.6 R, 33.6 A, 33.6 EP, 33.6 F, 33.6 PQ, 33.6 UB, 33.6 UA, 33.8 R, 33.8 EP, 33.8 F, 33.8 UB, 33.8 UA, 41 A, 41 AG, 41 C, 67 R, 67 S, 67 TN, 836, 874, 875, 878, 879, 880, 881, 884, 885, 886, 887, 888, 889, 890, 890, 894, 895, 896, 897, 898, 899, 900, 901

UNITED STATES PATENT OFFICE
CERTIFICATE OF CORRECTION

Patent No. 3,707,524      Dated December 26, 1972

Inventor(s) Otto F. Vogl

It is certified that error appears in the above-identified patent and that said Letters Patent are hereby corrected as shown below:

Col. 2, line 15 - "ketone" should be -- ketene --.

Col. 4, line 56 - "$C^{16}$" should be -- $CR^{16}$ --.

Col. 12, Table I, Example 17 - Delete "5" in the last column.

Col. 13, line 63 - "A,A' " should be -- $\alpha,\alpha'$ --.

Col. 14, line 36 - "colled" should be -- cooled --.

Col. 16, line 51 - "4.6" should be -- 44.6 --.

Col. 17, line 14 - "60" should be -- 6.0 --

Col 21, line 16 - "claim 2" should be -- claim 1 --.

Signed and sealed this 13th day of November 1973.

(SEAL)
Attest:

EDWARD M. FLETCHER, JR.
Attesting Officer

RENE D. TEGTMEYER
Acting Commissioner of Patents